(Model.)

R. ASHE.
EDGE SETTING AND BURNISHING MACHINE.

No. 254,859. Patented Mar. 14, 1882.

WITNESSES
Fred Hains
H. C. Fogg

INVENTOR
Robt. Ashe
by his attys
Clarke & Raymond

UNITED STATES PATENT OFFICE.

ROBERT ASHE, OF SOMERVILLE, ASSIGNOR TO GEORGE W. COPELAND, OF MALDEN, MASSACHUSETTS.

EDGE SETTING AND BURNISHING MACHINE.

SPECIFICATION forming part of Letters Patent No. 254,859, dated March 14, 1882.

Application filed January 9, 1882. (Model.)

*To all whom it may concern:*

Be it known that I, ROBERT ASHE, of Somerville, in the county of Middlesex and State of Massachusetts, a citizen of the United States, have invented a certain new and useful Improvement in Edge Burnishing and Setting Machines, of which the following is a full, clear, and exact description, reference being had to the accompanying drawings, forming a part of this specification, in which—

Figure 1:
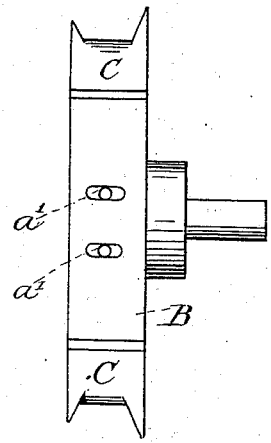
Figure 2:
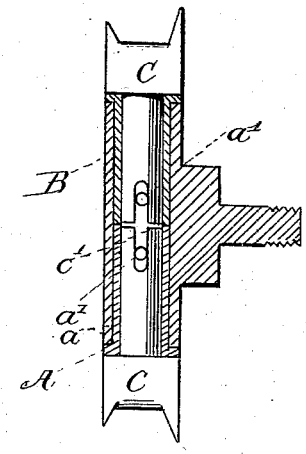
Figure 3:
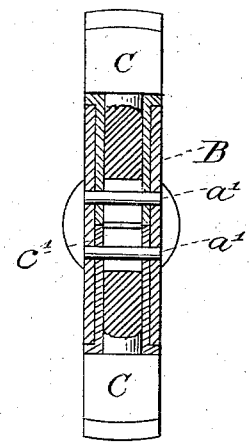
Figure 4:
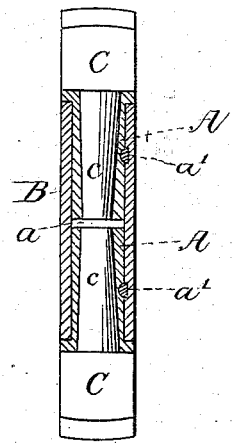
Figure 5:
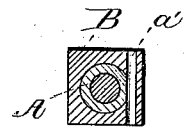

Figure 1 is a side elevation of the reversible head or stock of an edge-burnishing machine with the tools secured thereto. Fig. 2 is a vertical central section thereof. Fig. 3 is a vertical cross-section thereof. Fig. 4 is a vertical cross-section of a modified form of construction. Fig. 5 is a horizontal section on the line of one of the pins of Fig. 4.

This invention relates especially to means for securing the setting or burnishing tool to its head or stock; and it consists in a bushing, A, which is fastened in the hole $a$ in the stock or head B in a manner to permit its oscillation, either by means of a pin, $a'$, which extends across the head and passes through a recess in the side of the bushing or sleeve, as shown in Figs. 4 and 5, or which passes directly across the hole in the head or stock through slots in the bushing or sleeve, as represented in Figs. 1, 2, and 3. In the first construction I prefer that the interior of the bushing or sleeve be made to taper outwardly near the end, and that the spindle $c$ of the burnishing-tool C be made to accurately fit it throughout the greater portion of its length or its entire length, in order that the friction, when the spindle is pressed home with some force, may be sufficient to hold the tool in place or from falling from the bushing. When the second construction is used I prefer to make the bushing or sleeve of uniform diameter throughout, and to make the spindle of the tool to fit therein; and to enable the spindle to slide by the cross-pin it will be neccessary to have therein a recess. This recess should be of the width of the pivot, and the friction between the surface of the pivot and the sides of the recess and the surfaces of the spindle and sleeve will be sufficient to hold the tool securely to the stock while it is being reciprocated. To provide the tool with the necessary oscillation when this last-described form of construction is used, it will be necessary that the holes for the reception of the ends of the pivot in the stock shall be made in the form of slots, so that the pin may be turned a portion of a revolution upon the center, which is the axial line of the spindle.

Having thus fully described my invention, I claim and desire to secure by Letters Patent of the United States—

An improved tool head or stock, consisting of a hollow holder provided with a bushing or sleeve adapted to oscillate therein, and a tool having a spindle fitting within such sleeve or bushing, and held therein by frictional contact, all substantially as set forth.

ROBERT ASHE.

Witnesses:
F. F. RAYMOND, 2d,
WILLARD C. FOGG.